United States Patent
Poornachandran et al.

(10) Patent No.: US 10,482,566 B2
(45) Date of Patent: Nov. 19, 2019

(54) PERSONALIZED VIRTUAL REALITY CONTENT BRANCH PREDICTION

(71) Applicant: Intel Corporation, Santa Clara, CA (US)

(72) Inventors: Rajesh Poornachandran, Portland, OR (US); Niveditha Sundaram, Hillsboro, OR (US); Ryan D. Saffores, Hillsboro, OR (US); Kalyan K. Kaipa, Bangalore (IN); Gomathi Ramamurthy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/937,425

(22) Filed: Mar. 27, 2018

(65) Prior Publication Data

US 2018/0286007 A1 Oct. 4, 2018

(30) Foreign Application Priority Data

Mar. 31, 2017 (IN) .............................. 201741011576

(51) Int. Cl.
*G06Q 30/02* (2012.01)
*G06T 1/20* (2006.01)
*H04L 29/06* (2006.01)
*G06N 5/02* (2006.01)
*H04L 29/08* (2006.01)

(52) U.S. Cl.
CPC ................. *G06T 1/20* (2013.01); *G06N 5/02* (2013.01); *G06Q 30/0269* (2013.01); *H04L 67/306* (2013.01); *H04L 67/34* (2013.01); *H04L 67/38* (2013.01); *G06F 2203/011* (2013.01); *G06Q 30/0271* (2013.01)

(58) Field of Classification Search
None
See application file for complete search history.

(56) References Cited

U.S. PATENT DOCUMENTS

| 8,374,687 | B2 * | 2/2013 | Mathan | G06K 9/00536 600/544 |
| 9,063,330 | B2 * | 6/2015 | Lavalle | G02B 27/017 |
| 9,804,669 | B2 * | 10/2017 | Fateh | G06F 3/147 |
| 2009/0298650 | A1 * | 12/2009 | Kutliroff | A63B 71/0622 482/8 |
| 2014/0026048 | A1 * | 1/2014 | Spirer | G06F 3/0484 715/716 |
| 2014/0026066 | A1 * | 1/2014 | Fishman | G06Q 30/0271 715/745 |
| 2014/0049563 | A1 * | 2/2014 | Tobin | G06F 3/012 345/649 |
| 2014/0096189 | A1 * | 4/2014 | Kafka | G06F 21/31 726/3 |

(Continued)

Primary Examiner — Joni Richer
(74) Attorney, Agent, or Firm — Schwegman Lundberg & Woessner, P.A.

(57) ABSTRACT

Methods, apparatus, and machine-readable mediums are described for doing predictive content branch selection for rendering environments such as virtual reality systems. User data is aggregated from multiple users. Each user is classified based upon the user data. Personalization parameters are identified for each of the plurality of users. Content to be presented is determined and modified with a modification for a user based upon the personalization parameters for the user. The modified content is sent to the user.

21 Claims, 5 Drawing Sheets

(56) References Cited

U.S. PATENT DOCUMENTS

| | | | |
|---|---|---|---|
| 2014/0108129 A1* | 4/2014 | Klein | G06Q 30/02 |
| | | | 705/14.45 |
| 2016/0018872 A1* | 1/2016 | Tu | G06F 1/3234 |
| | | | 345/173 |
| 2016/0228771 A1* | 8/2016 | Watson | G06F 3/013 |
| 2016/0232244 A1* | 8/2016 | Liu | G06F 17/30867 |
| 2018/0240157 A1* | 8/2018 | Gopalakrishnan | G06N 3/08 |

* cited by examiner

PERSONALIZED VIRTUAL REALITY CONTENT BRANCH PREDICTION

CLAIM OF PRIORITY

This patent application claims the benefit of priority to India Patent Application No. 201741011576, filed Mar. 31, 2017, which is hereby incorporated by reference herein.

TECHNICAL FIELD

Embodiments described herein relate generally to machine learning, specifically to personalized virtual reality content branch prediction to provide customized user experience.

BACKGROUND

Virtual reality (VR) systems are highly sensitive to latency. One commonly accepted bound on latency for an acceptable virtual reality experience is 60 milliseconds (ms). Latencies below 20 ms, however, may make updates to a virtual reality experience imperceptible to a user. Longer latencies may lead to a detached virtual reality experience and may also cause a user to experience motion sickness and/or dizziness.

Cloud VR rendering is an application where a simple client application forwards control information to a remote server. The remote server renders and streams back real-time VR content. This type of rendering has benefits, but network and compression latencies may make for a lower quality user experience (UX).

In addition to latency, another issue with cloud VR rendering is the generated content is not personalized or tailored to specific users. That is, immersive interactive content is not customized based on emotion, physical, and/or biological responses determined via user interaction. This can lead to content that does not adapt to a user's needs and/or limitations, which may lead to a poor UX.

DETAILED DESCRIPTION

Various examples described below are directed to crowd sourced predictive processes that may reduce latency, work load offloading from VR Head Mounted Display (HMD), and provide personalized virtual reality user experiences. Physical and emotional responses of users to immersive interactive VR content may be learned from aggregated ambient, wearable, bio, sensory data from multiple sensors across one or more crowd sourced VR users. Processing data, such as with machine learning, may be done at local ambient devices that may then send control information to a remote server for adaptive real time customized VR content. This may reduce latency between the VR system and the remote server and enable collaborative work load partition between the VR HMD and the content generation server. Using the aggregated data, a remote server, such as a cloud VR content generator, may perform smart predictive/customized content rendering.

Sensory data, such as visual, emotion, biological, physical data, from users of multiple VR systems may be aggregated together. In an example, sensory data may be mapped to specific portions, e.g., one or more frames, of content. The sensory data may be analyzed and used to perform branch prediction of user movement for the content. In addition, predictive scene rendering may be done using the sensory data. Pre-rendered scene content may also be provided to client devices. For example, the pre-rendered scene content may be provided as a user nears a location of the pre-rendered scene in VR content.

Figure 1:
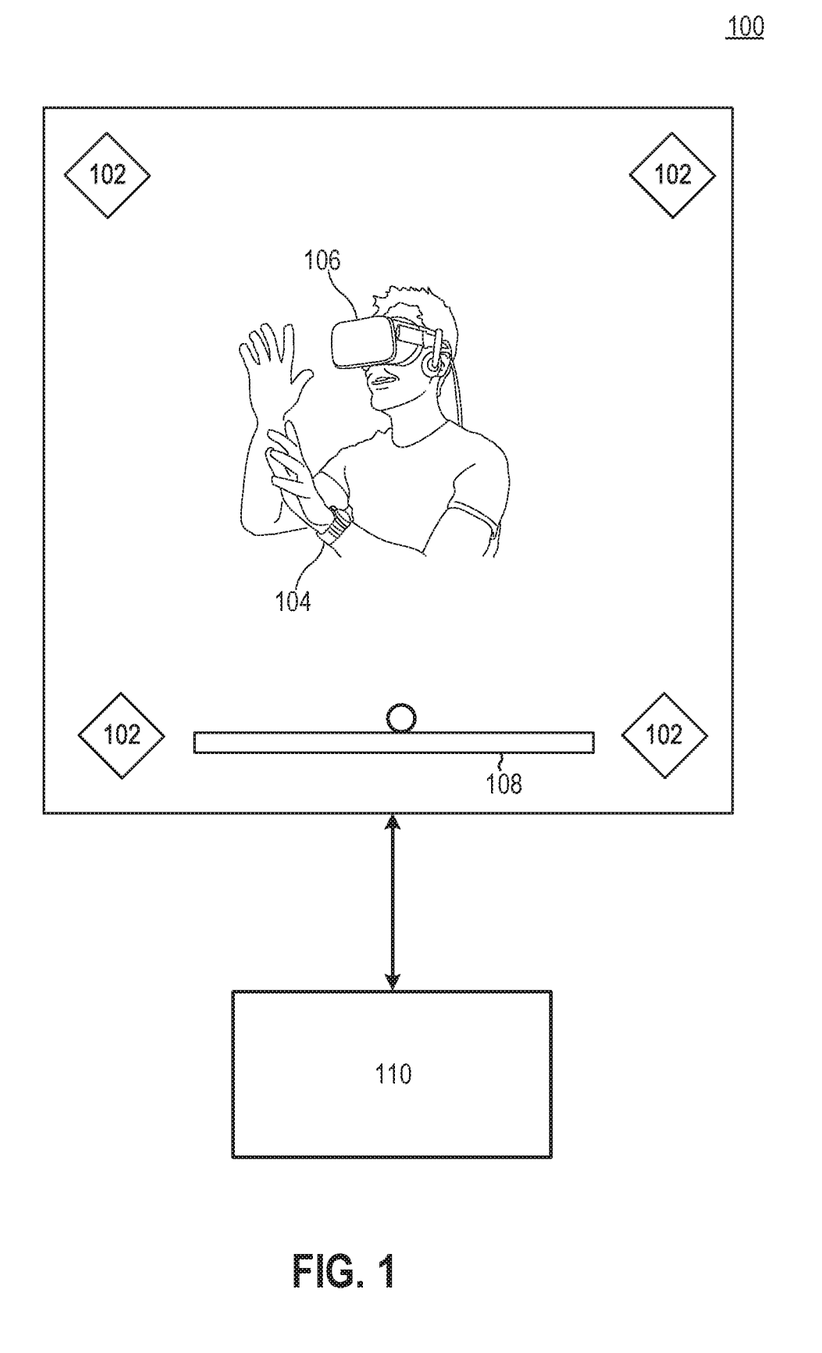
FIG. 1 is a block diagram of a virtual reality system in accordance with some examples.

FIG. 1 is a block diagram of a virtual reality system 100 in accordance with some examples. The virtual reality system 100 includes a VR headset 106. In addition to providing the content to a user, the VR headset 106 may also monitor a user's head movement, facial expression, breathing pattern, collision proximity, eye movement, brainwave patterns, and pupil dilation. This user data may be provided to a remote server 110 over a network (not shown). The remote server 110 may be any compute element that is remote/detached from the VR headset 106. For example, the remote server 110 may be one of a companion PC/gaming console, gateway, edge compute server in a service provider base station, etc.

The remote server 110 may aggregate the user's data with user data from other users (if available). The virtual reality system 100 may also include a wearable item 104. The wearable item 104 may be a watch, a heart monitor, pulse monitor, pedometer, etc. User data recorded from wearable items may include heart rate, temperature, number of steps, calories burned, brainwave patterns, nausea detector, etc. The virtual reality system 100 may also include a camera 108. The camera 108 may record user position, body language, heart rate, temperature, geographic spacing, etc. In addition, the camera 108 may also include a 3D depth camera, a microphone that allows for voice recognition and/or keyword detection. The virtual reality system 100 may also include one or more speakers 102 that provide audio content to the user. In addition, a VR system may also include a geo fence to identify the location of a user.

The user data may be collected as VR content and is displayed to the user. The user data may be mapped to the displayed VR content. This mapping provides a link between the user's emotional, physical, and/or biological state and the rendered content. The user data from all of these devices may be sent to a remote server 110. The remote server 110 may aggregate the user data from numerous other users. Using the aggregated data, the remote server 110 may classify a typical response to particular content. This classification may be used as a baseline to measure a user that is currently viewing the content. Comparing the current user with the baseline may allow the remote server 110 to determine how to modify the content for the current user.

Figure 2:
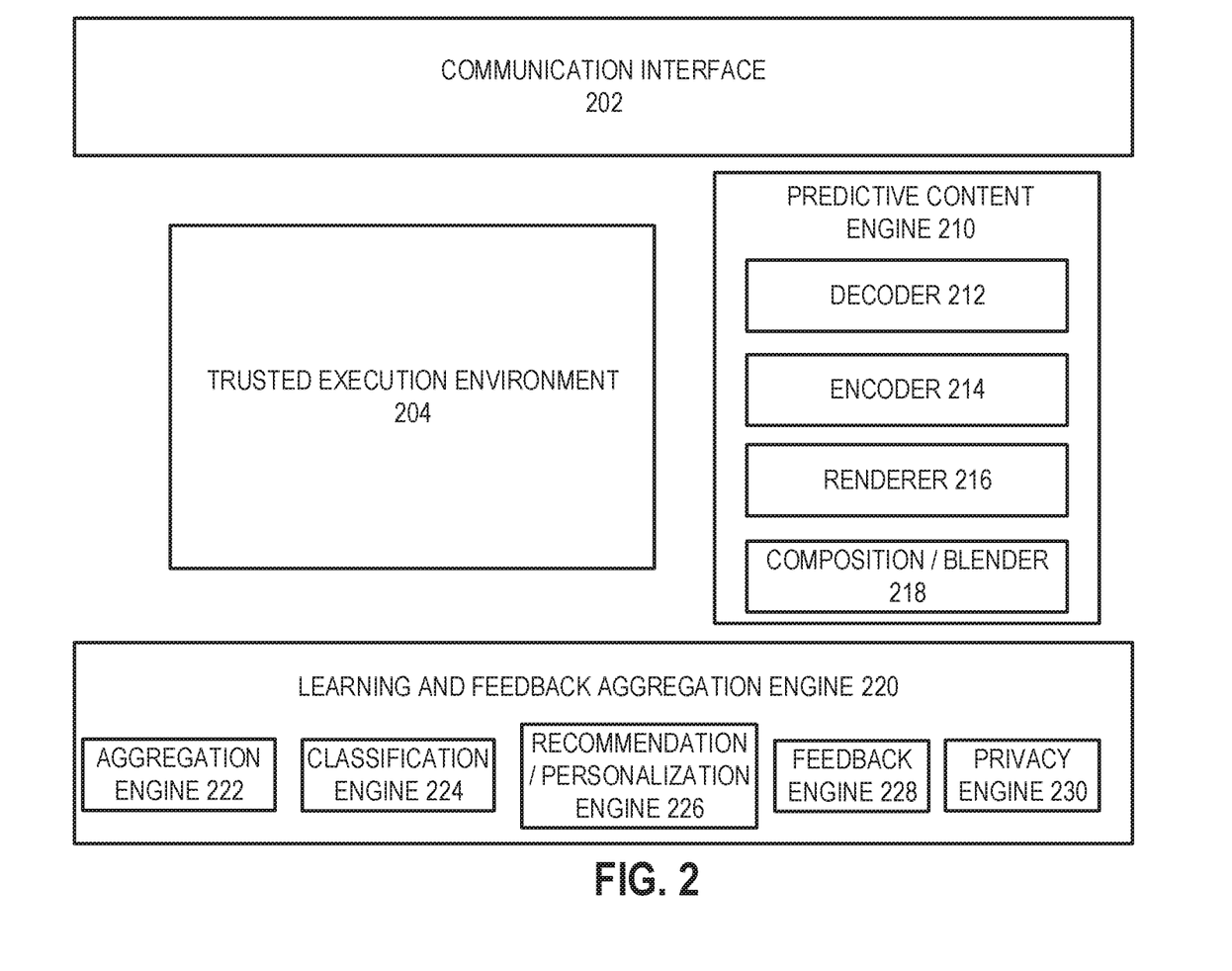
FIG. 2 illustrates a system architecture for a cloud VR content engine in accordance with some examples.

FIG. 2 illustrates a system architecture for a cloud VR content engine 200 in accordance with some examples. In an example, the remote server 110 in FIG. 1 is a cloud VR content engine 200. The cloud VR content engine 200 includes a communication interface 202. Communication between the cloud VR content engine 200 and VR systems may be done through the communication interface 202. The communication interface 202 may include a bandwidth manager and a protocol/session manager (not shown). The bandwidth manager may enforce bandwidth policies between the cloud VR content engine 200 and VR systems or individual devices of a VR system.

The cloud VR content engine 200 may also include a trusted execution environment 204 that provides dedicated storage for user privacy/sensitivity information, keys, licenses, and metering analytics. In an example, the trusted execution environment 204 may be used for privacy preservation. Sensitive or privacy information on users may be anonymized in a tamper resistant manner based on policy configuration. The trusted execution environment 204 may also be tamper resistant and provide an isolated execution environment. In an example, the trusted execution environment 204 may be used for a secure time synchronization between a VR system and the cloud VR content engine 200. In an example, each of one or more devices of the VR system perform a secure time synchronization. The trusted execution environment 204 may be used for remote attestation and tamper resistant clock synchronization. Once synchronized, collected user data may be co-related to specific content provided by the cloud VR content engine 200.

The cloud VR content engine 200 also includes a learning and feedback aggregation engine 220. An aggregation engine 222 aggregates the user data from the various VR systems. In addition, the aggregation engine 222 may also aggregate data from various internet of things (IOT) sensing devices. In an example, the aggregation engine 220 may be executed within the trusted execution environment 204. Sampling rates may be configurable to control the amount of data collected and/or stored by the aggregation engine 222. A classification engine 224 classifies the user data. In an example, the classification engine 224 uses rule based data classification. User data from a variety of VR systems may be classified using trained data sets. The data may be classified based upon the type of content. For example, typical emotional responses for specific content may be classified. Content may be classified as corresponding to one or more emotional states, such as, but not limited to frightening, exciting, happy, etc. In addition, the physical state of a user may be determined from the data of a single user. The physical state may be used to determine different typical responses to content based on physical states. For example, a user may be classified as agile or slow. The type of response to content for an agile user may be different than the type of response for a slow user.

As another example, the classification engine 224 may determine a user's mood using user data such as facial expression, heart rate, eye dilation, eye movement, etc. In addition, a user's comfort level may also be determined. Various user profiles may be determined using the aggregated data. For example, user profiles for a resting user, an active user, a scared user, etc. may be determined. A user's current user data may be used to determine a user's current level of comfort. In an example, nausea and/or balance of a user is determined using the user's current data and learned profiles. In addition, certain content or types of content may have an associated user performance profile. The user's current user data may be compared against the user performance profile to determine the content's effectiveness in achieving the desired characteristics that are in the user performance profile.

A recommendation/personalization engine 226 provides content for a particular user based on user data patterns/observed characteristics. The current state, e.g., physical, emotional, etc., of a user may be determined using the classification engine 224. Personalization parameters for the user may be determined by the recommendation/personalization engine 226. For example, a user may be determined to be young and agile while another user is older and has slower hand-eye coordination. The state of the user may be determined by the classification engine 224 comparing user data of one user with the aggregated user data against specific content rendered and associated user response characteristics. In addition, subsets of the aggregated user data may be used. Personalization parameters of the younger user may include an indication to include more surprises, louder audio, faster head movement, etc. In contrast, the recommendation/personalization engine 226 may determine personalization parameters for the older user to include less sudden movements, smaller and slower head movements, larger items, etc.

In an example, two users may interact with the same immersive content. Each participating device in the VR systems of the two users may perform a secure time synchronization with the content rendering server. The trusted execution environment 204 may be used for the remote attestation and tamper resistant clock synchronization. The participating devices may include wearable devices that can provide data regarding a user's breathing pattern, skin observation, heart rate, brainwave patterns, etc. In an example, a block chain peer vetting process may be employed across participating sensory nodes to identify the most observed user reaction for specific content. Block chain proof-of-work difficulty level may be chosen in a manner to intercept real-time deadlines. The aggregated sensory data may be abstracted via the trusted execution environment and may be recorded in a block chain public ledger.

Liner regression classification both on the physical and emotion data may be applied to the aggregated data with weights to classify a user. The emotion state, physical state, human factor, etc., may be classified. For example, if the user is happy, sad, frightened, agile, slow, play space fit with the user, etc., may be classified. The classifications of a user may be sorted and ranked to identify personalization parameters than may be used to provide a better user experience.

As an example, a user, Alice "A", may be classified as elderly and has slow hand-eye coordination. Another user, Bob "B", may be classified as young and agile. "A" may be a bit frustrated with the content experience, where "B" is excited and enjoying the same content.

Given the above inference, the content can be tailored to be provide a different experience for users A and B. For example, user A's content may be have less sudden movements, content interaction module is tolerant for poor "hand-to-eye coordination", where user B's content may have more surprises to keep user B excited.

In an example, personalization parameters may be determined using gradient boosting (GB) scores, optimal profile (OP) scores, and final platform (FP) optimal scores. These scores may be calculated as follows:

$$\text{GB score}(X) = \alpha M(X) + \beta N(X) + \gamma O(X) + \text{tolerable error}$$

where X refers to a user response (e.g. emotion) under consideration,

M( ), N( ) and O( ) refer to error approximation functions, tolerable_error refers to the allowed tolerable error rate in the machine learning convergence (lower is better), and $\alpha$, $\beta$, and $\gamma$ refer to the respective optimal weights (these weights can be derived from the most asserted sensory event from aggregated data).

$$\text{OP score}(X) = \text{MaxMatch}(\text{GB score}(X)), i = 1 \ldots N$$

where X refers to a user response (e.g. emotion) under consideration, and MaxMatch is a function that returns the maximum match for the GB score among N configuration.

$$FP\ score = F(OP\ score(X\text{-}1), OP\ score(X\text{-}2) \ldots OP\ score(X\text{-}N)),$$

where N represents the total number of entity (e.g. emotion, physical response) under evaluation, X-1, X-2, X-N represent respective user profiles, and F is a function that takes the individual OP scores across all N entities and returns the most optimal score. Predictive content generator may use the FP score, to dynamically adapt the content under consideration (e.g., "C") for specific users under consideration. User "A" may get content "CA" and user "B" may get content "CB" in above example.

The FP score represents the overall aggregated score of user responses with respect to certain identified characteristics such as emotion, physical state, etc. This score may be utilized by the Predictive Content Engine 210's renderer 216 component to branch predict content selection.

For example, a game developer may have the following criteria, FP score (movement)>threshold (wherein threshold can be a heuristic based number, e.g. 5 that a content developer can build upon based on crowd-sourced user feedback), then increase loudness or sudden camera panning movement in rendered content. If the FP score is less than the threshold, then decrease loudness or reduce camera panning movement.

Above such branch prediction can be employed for variety of features (e.g. physical movement, emotional response, neurological excitement, etc.), and may be implemented in a hierarchal manner for more sophisticated branch prediction and customization.

Personalization parameters may also be determined using user preferences. For example, a user may indicate a desired level of difficult, affinity for frightening content, etc. These user preferences may be used in combination with the aggregated user data and the user's user data to personalize content.

The learning and feedback aggregation engine 220 may also include a feedback engine 228. The feedback engine 228 receives user data. The user data may be stored as part of the aggregated data. The feedback engine 228 may also determine how a user responded to previous content. User preferences may then be updated based upon how a user responded to content.

In another example, a user may play a VR game that contains frightening content. The user may have provided a user preference indicating the user has an affinity for frightening content. As the user plays the VR game, user data may be classified as showing the user's current mood is one of excitement. In the VR game, a noise is to be inserted somewhere near the user. The exact location of the noise may be determined by the recommendation/personalization engine 226. For example, noting the user is excited and has a preference for being scared, the noise may be inserted close to a user in a location where the user has previously looked but is not currently looking. If and when the user looks at the location, an object, such as a zombie, may appear causing a jump scare.

The feedback engine 228 may monitor the user's data to see how the user reacted to the location of the noise. The feedback engine 228 may monitor the user's comfort level. If the user has begun to experience dizziness, disorientation, nausea, the user data can be aggregated with the other user data relating to inserting a noise that close to a user. In addition, the data may be aggregated with user data from the particular user. Thus, a personal profile for a particular user may be created. If the user's mood is one of discomfort, the user data may indicate that the insertion point was too intense or there was too much head movement for the user. In future insert determinations, the recommendation/personalization engine 226 may determine to insert a noise or another event closer to a user's current view to reduce the amount of head movement. In addition, the insertion event may be located further away from the user.

In another example, the user data may indicate that the user was unresponsive to the insertion point or reacted in an unexpected way for the user's skill level preference. Future insertion points may be made to be more obvious to the user. For example, audio could be louder, the object inserted could be moved to a more visually obvious in the scene, or the inserted object could be further away from the user giving the user more time to react.

A privacy engine 230 may also be part of the learning and feedback aggregation engine 220. The privacy engine 230 allows users to specify how their data is collected. For example, when a user is using a VR system at home, the data could not be aggregated. As another example, the privacy engine 230 may strip out certain data, such as a name, location, images, health vital signs, etc. from the user data.

A predictive content engine 210, receives the recommendation from the recommendation/personalization engine 226. The predictive content engine 210 determines the content that is to be rendered and presented to a user. In addition, the predictive content engine 210 uses the recommendations to modify the content for the user. In an example, the predictive content engine 210 may be ran within the trusted execution environment 204. A decoder 212 may decode stored images/objects that are to be inserted or added to content. A composition/blender 218 arranges various visual elements/objects in a scene for a VR user. A renderer 216 renders the scene for the VR user. An encoder 214 encodes the scene for transmitting to the VR user. In an example, the predictive content engine 210 may determine an expected latency to transmit data to a user and client rendering capabilities. The content rendered may take into account the expected latency, client VR headset capabilities/limitations, etc. For example, a lower resolution scene or object may be rendered due to the expected latency. As another example, scene updates may be generated on an on-demand basis based upon the expected latency.

Figure 3:
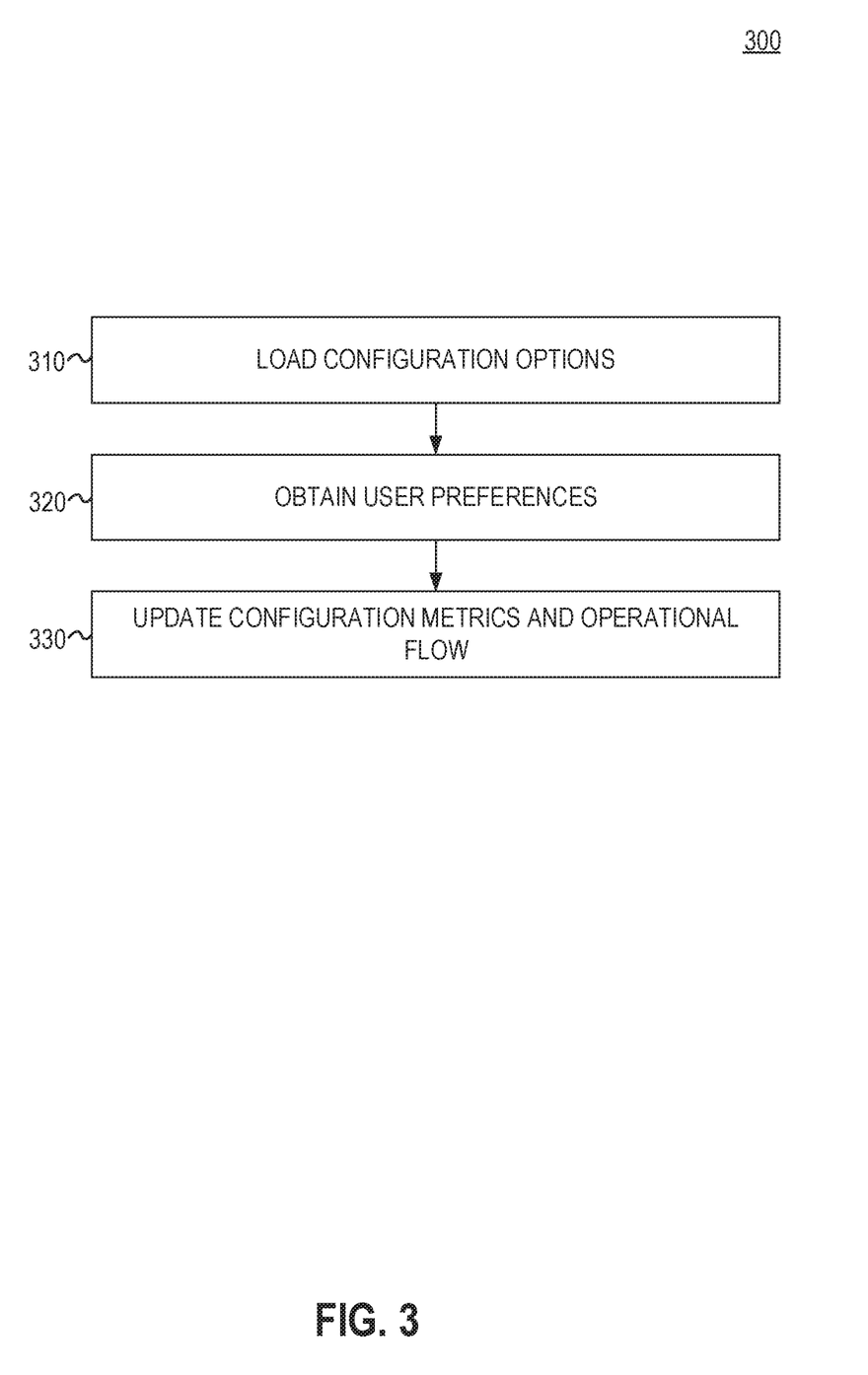
FIG. 3 is a flow diagram for a process for user configuration in accordance with some examples.

FIG. 3 is a flow diagram for a process 300 for user configuration in accordance with some examples. The process flow 300 may be executed on a computing device or in a Trusted Execution Environment (TEE 204). At operation 310, a user's configuration options are loaded from storage. The configuration options may be presented to the user via a dashboard user interface. A new user may be presented with default options that the user may override via the user interface. At operation 320, the user's preferences are received by server. The server may be the cloud. VR content engine 200 from FIG. 2. At operation 330, the server may store the user's preferences for use with the learning and feedback aggregation engine 220.

Figure 4:
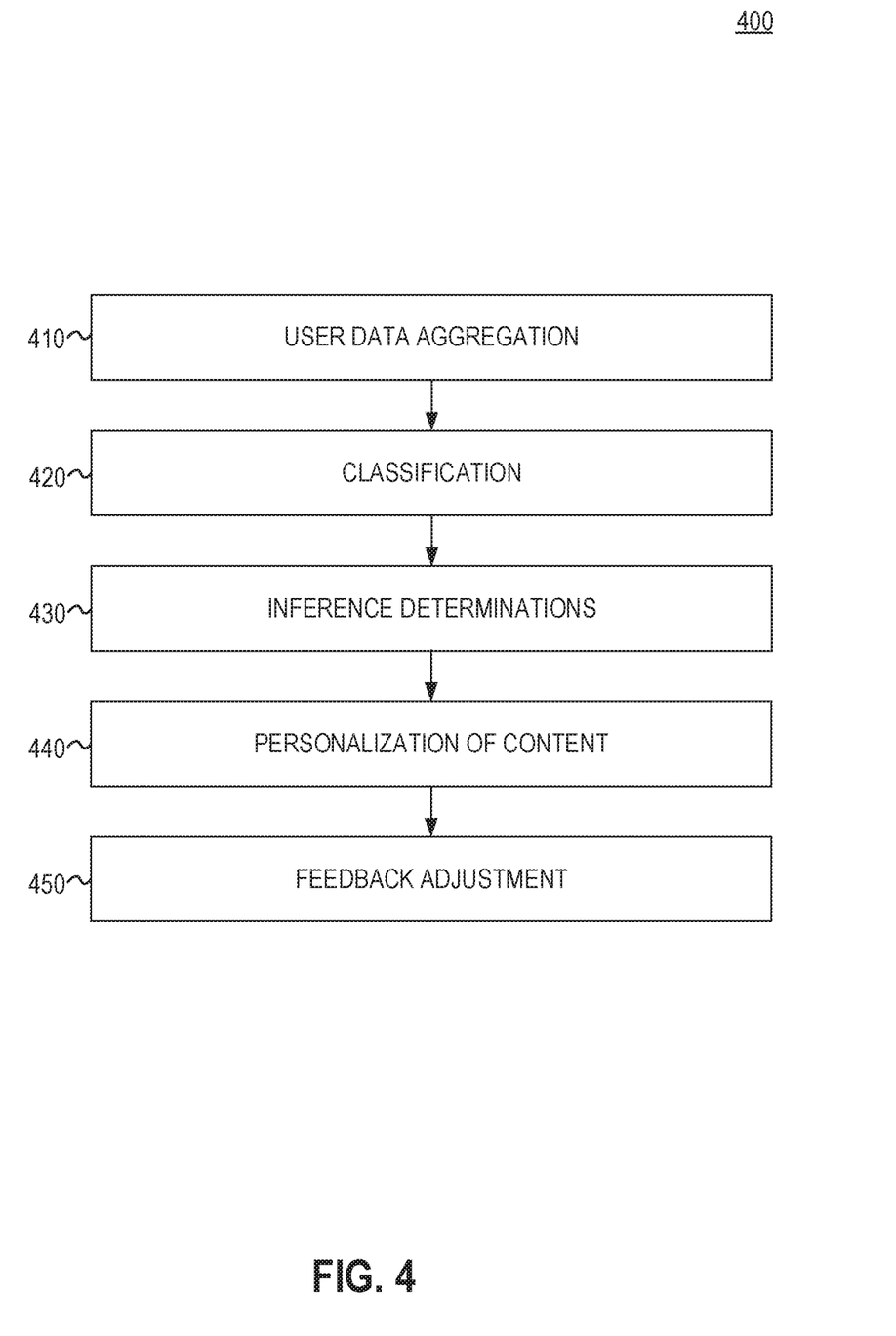
FIG. 4 is a flow diagram for a process for providing personal predictive content generation in accordance with some examples.

FIG. 4 is a flow diagram for a process 400 for providing personal predictive content generation in accordance with some examples. The process flow 400 may be executed on a computing device. At operation 410, user data is aggregated from various VR systems and components. The data aggregation may be ongoing as well, as user data may continuously be received and aggregated from users using VR systems. In addition to user data, user preferences for users may be stored. At operation 420, the aggregated data is classified. In an example, a rule based machine learning classification is done. At operation 430, inference determinations are made based upon the classified data. The classified data sets and any user preferences are used to determine various inferences. In addition, current user data from an active user may also be used to determine inferences regarding the current user. For example, a user's motion in VR content may be identified or predicted. As another example, potential user reactions to VR content may be determined.

At operation 440, content is personalized based upon the determined inferences. In an example, content is generated that may be applicable for one of the determined potential user reactions. In addition, pre-rendered content related to the user's motion may be determined and off loaded. In an example, the bandwidth available for the user and the user's device characteristics are used to determine pre-rendered content that is off loaded. In addition, as described above various modifications of content may take place based upon the user's user data and the aggregated user data.

The personalization of content may not be fully accurate. For example, the user movement may be predicted to be 20 degrees, but in reality the user may have turned their head 19 degrees. The 20 degree content may be rendered and sent to the user prior to the user actually turning their head. When the user does turn their head, but by only 19 degrees, residual information may be provided rather than re-rendering the entire content for 19 degrees. Residual information may be the difference between the two rendered scenes. The differences in the rendered content may be determined and only the differences may be transmitted down to the user. Using this method, rendered predictive content may be provided prior to the content being displayed. Then the residual information, which requires less bandwidth to transmit, may be provided for rendering. Thus, network bandwidth and compute bandwidth is better utilized compared to sending both fully rendered scenes. In addition, some clients may have the ability to start decoding the content prior to needing to display the content. These clients may then be able to decode the content before the decoded content is needed. Decoding the residual information, therefore, may reduce latency for users. For example, decoding may be done at 20 ms intervals and decoding may take 5 ms. The reaction time will be 5 ms. Devices that may do early decoding, however, may be able to do residual decoding 2 ms. The reaction time, therefore, may be reduced to 2 ms as the full decoding may be done before the decoded content is needed.

Continuing this example, the cloud VR content engine may store a histogram of sensory data along with appropriate weights for each user that may be used for the predictive content generation. For example, the turn angle for various users may be aggregated. In addition, the turn angles may be associated with particular content. Thus, when a user is shown the particular content, the turn angle of the user may be predicted. For example, Pr (turn=x degrees/previous turn=y degrees) may be calculated from the histogram table. The most likely turn angle may be computed and then used to determine the content to offload.

At operation 450, additional user data related to modified content is received. This feedback data may be used to verify the user had the appropriate reaction to the content or the content was rendered for the user with a latency below a threshold. The feedback data may be used to modify the classification and inference determinations described above.

Examples, as described herein, may include, or may operate on, logic or a number of circuits, components, modules, or engines, which for the sake of consistency are termed engines, although it will be understood that these terms may be used interchangeably. Engines are tangible entities capable of performing specified operations and may be configured or arranged in a certain manner. Engines may be realized as hardware circuitry, as well one or more processors programmed via software or firmware (which may be stored in a data storage device interfaced with the one or more processors), in order to carry out the operations described herein. In this type of configuration, an engine includes both, the software, and the hardware (e.g., circuitry) components. In an example, circuits may be arranged (e.g., internally or with respect to external entities such as other circuits) in a specified manner as an engine. In an example, the whole or part of one or more computer systems (e.g., a standalone, client or server computer system) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time. In view of the above definition, engines are structural entities that have both, a physical structure, and an algorithmic structure. According to some embodiments, engines may constitute the structural means for performing certain algorithmic functions described herein.

Figure 5:
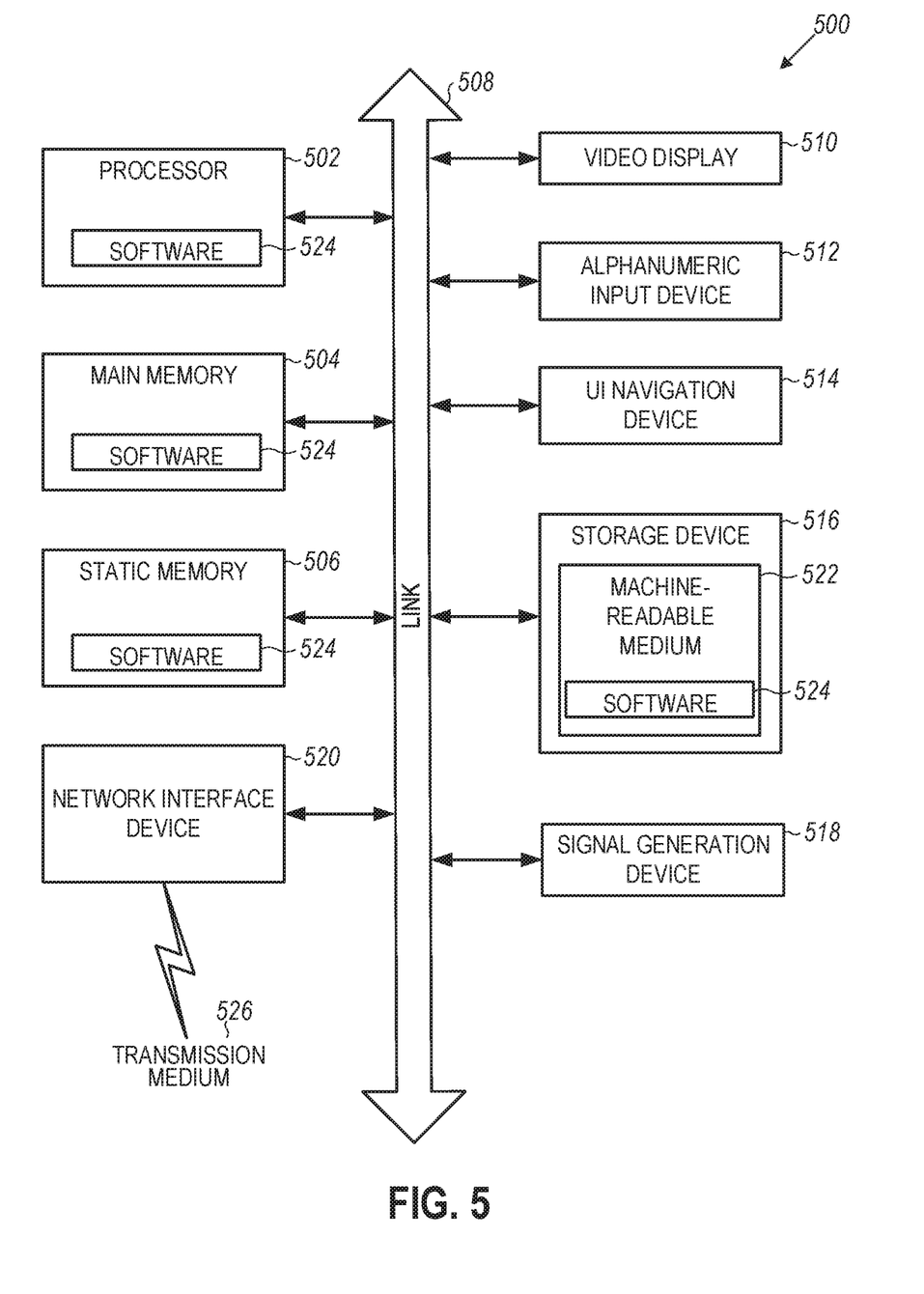
FIG. 5 is an example computing device that may be used in conjunction with the technologies described herein.

FIG. 5 is an example computing device that may be used in conjunction with the technologies described herein. In alternative embodiments, the computing device 500 may operate as a standalone device or may be connected (e.g., networked) to other computing devices. In a networked deployment, the computing device 500 may operate in the capacity of a server communication device, a client communication device, or both in server-client network environments. In an example, the computing device 500 may act as a peer computing device in peer-to-peer (P2P) (or other distributed) network environment. The computing device 500 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations.

Computing device 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The computing device 500 may further include a display unit 510, an input device 512 (e.g., a keyboard), and a user interface (UI) navigation device 514 (e.g., a mouse). In an example, the display unit 510, input device 512, and UI navigation device 514 may be a touch screen display. In an example, the input device 512 may include a touchscreen, a microphone, a camera (e.g., a panoramic or high-resolution camera), physical keyboard, trackball, or other input devices.

The computing device 500 may additionally include a storage device (e.g., drive unit) 516, a signal generation device 518 (e.g., a speaker, a projection device, or any other type of information output device), a network interface device 520, and one or more sensors 521, such as a global positioning system (GPS) sensor, compass, accelerometer, motion detector, or other sensor. The computing device 500 may include an input/output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 516 may include a computing device (or machine) readable medium 522, on which is stored one or more sets of data structures or instructions 524 (e.g., software) embodying or utilized by any one or more of the techniques or functions described herein. In an example, at least a portion of the software may include an operating system and/or one or more applications (or apps) implementing one or more of the functionalities described herein. The instructions 524 may also reside, completely or at least partially, within the main memory 504, within the static memory 506, and/or within the hardware processor 502 during execution thereof by the computing device 500. In an example, one or any combination of the hardware processor 502, the main memory 504, the static memory 506, or the storage device 516 may constitute computing device (or machine) readable media.

While the computing device readable medium 522 is illustrated as a single medium, a "computing device readable medium" or "machine-readable medium" may include a single medium or multiple media (e.g., a centralized or distributed database, and/or associated caches and servers) configured to store the one or more instructions 524.

In an example, a computing device readable medium or machine-readable medium may include any medium that is capable of storing, encoding, or carrying instructions for execution by the computing device 500 and that cause the computing device 500 to perform any one or more of the techniques of the present disclosure, or that is capable of storing, encoding or carrying data structures used by or associated with such instructions. Non-limiting computing device readable medium examples may include solid-state memories; and optical and magnetic media. Specific examples of computing device readable media may include: non-volatile memory; such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. In some examples, computing device readable media may include non-transitory computing device readable media. In some examples, computing device readable media may include computing device readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IFEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 520 may include one or more physical jacks (e.g., Ethernet, coaxial, or phone jacks) or one or more antennas to connect to the communications network 526. In an example, the network interface device 520 may include one or more wireless modems, such as a Bluetooth modem, a Wi-Fi modem or one or more modems or transceivers operating under any of the communication standards mentioned herein. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. In an example, a transmission medium may include any intangible medium that is capable of storing, encoding or carrying instructions for execution by the computing device 500, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

Additional Notes and Examples

Example 1 is a system for content branch selection, the system comprising: processing circuitry to: aggregate user data from a plurality of users, the user data comprising data from a plurality of devices; classify each of the plurality of users based on the user data; identify personalization parameters for each of the plurality of users; determine content to present; modify the content with a first modification for a first user based upon the personalization parameters for the first user; modify the content with a second, different, modification for a second user based upon the personalization parameters for the second user; send the content with the first modification to the first user; and send the content with the second modification to the second user.

In Example 2, the subject matter of Example 1 optionally includes the content with the first modification is presented to the first user in in one of a virtual reality, augmented reality, or mixed reality environment.

In Example 3, the subject matter of Example 2 optionally includes wherein the processing circuitry is to update the user data based upon additional user data received from the first user based upon the content with the first modification being presented to the first user.

In Example 4, the subject matter of any one or more of Examples 1-3 optionally include a trusted execution environment to synchronize time with the plurality of devices, wherein the processing circuitry is to relate the received user data with a frame from the content.

In Example 5, the subject matter of any one or more of Examples 1-4 optionally include the user data comprising one of a breathing pattern, heart rate, brainwave pattern, eye dilation, eye movement, geo fence data, ambient lighting data, user motion, facial recognition, facial expression, user agility, hand-eye coordination data, key words, and audio cues.

In Example 6, the subject matter of Example 5 optionally includes where to classify each of the plurality of users the processing circuitry is to determine an emotional state of a user for the content.

In Example 7, the subject matter of any one or more of Examples 5-6 optionally include where to classify each of the plurality of users the processing circuitry is to determine a physical state of a user for the content.

In Example 8, the subject matter of Example 7 optionally includes where to identify personalization parameters the processing circuitry is to determine an amount of user movement suitable for future content.

In Example 9, the subject matter of any one or more of Examples 7-8 optionally include where to identify personalization parameters the processing circuitry is to determine an enjoyment level of the content.

In Example 10, the subject matter of any one or more of Examples 1-9 optionally include where to modify the content with the first modification for the first user the processing circuitry is to determine an insertion location for a content event.

In Example 11, the subject matter of Example 10 optionally includes where the processing circuitry is to determine an effectiveness of the content event.

In Example 12, the subject matter of Example 11 optionally includes where the processing circuitry is to determine a second insertion location for the content event based upon the effectiveness of the content event.

In Example 13, the subject matter of any one or more of Examples 1-12 optionally include where the processing circuitry is to determine a level of motion sickness in the first user based upon the user data, where the first modification is based upon the level of motion sickness.

In Example 14, the subject matter of any one or more of Examples 1-13 optionally include where to modify the content with a first modification the processing circuitry is to determine an angle of head movement based on the content and the aggregated user data, the modification is based upon the angle of head movement.

In Example 15, the subject matter of Example 14 optionally includes where the processing circuitry is to: determine an error amount from the angle of head movement; create additional content based upon the error amount; and send the additional content to the first user.

Example 16 is a method for content branch selection, the method comprising: receiving user data from a plurality of users, the user data comprising data from a plurality of devices; classifying each of the plurality of users based on the user data; identifying personalization parameters for each of the plurality of users; determining content to present; modifying the content with a first modification for a first user based upon the personalization parameters for the first user; modifying the content with a second, different, modification for a second user based upon the personalization parameters for the second user; sending the content with the first modification to the first user; and sending the content with the second modification to the second user.

In Example 17, the subject matter of Example 16 optionally includes the content with the first modification is presented to the first user in one of a virtual reality, augmented reality, or mixed reality environment.

In Example 18, the subject matter of Example 17 optionally includes updating the user data based upon additional user data received from the first user based upon the content with the first modification being presented to the first user.

In Example 19, the subject matter of any one or more of Examples 16-18 optionally include synchronizing time with the plurality of devices; and relating the received user data with a frame from the content.

In Example 20, the subject matter of any one or more of Examples 16-19 optionally include the user data comprising one of a breathing pattern, heart rate, brainwave pattern, eye dilation, eye movement, geo fence data, ambient lighting data, user motion, facial recognition, facial expression, user agility, hand-eye coordination data, key words, and audio cues.

In Example 21, the subject matter of Example 20 optionally includes where classifying each of the plurality of users comprises determining an emotional state of a user for the content.

In Example 22, the subject matter of any one or more of Examples 20-21 optionally include where classifying each of the plurality of users comprises determining a physical state of a user for the content.

In Example 23, the subject matter of Example 22 optionally includes where identifying personalization parameters comprises determining an amount of user movement suitable for future content.

In Example 24, the subject matter of any one or more of Examples 22-23 optionally include where identifying personalization parameters comprises determining an enjoyment level of the content.

In Example 25, the subject matter of any one or more of Examples 16-24 optionally include where modifying the content with the first modification for the first user comprises determining an insertion location for a content event.

In Example 26, the subject matter of Example 25 optionally includes determining an effectiveness of the content event.

In Example 27, the subject matter of Example 26 optionally includes determining a second insertion location for the content event based upon the effectiveness of the content event.

In Example 28, the subject matter of any one or more of Examples 16-27 optionally include determining a level of motion sickness in the first user based upon the user data, where the first modification is based upon the level of motion sickness.

In Example 29, the subject matter of any one or more of Examples 16-28 optionally include where modifying the content with a first modification comprises determining an angle of head movement based on the content and the aggregated user data, the modification is based upon the angle of head movement.

In Example 30, the subject matter of Example 29 optionally includes determining an error amount from the angle of head movement; creating additional content based upon the error amount; and sending the additional content to the first user.

Example 31 is at least one computer-readable medium, including instructions, which when executed by a machine, cause the machine to perform operations: receiving user data from a plurality of users, the user data comprising data from a plurality of devices; classifying each of the plurality of users based on the user data; identifying personalization parameters for each of the plurality of users; determining content to present; modifying the content with a first modification for a first user based upon the personalization parameters tier the first user; modifying the content with a second, different, modification for a second user based upon the personalization parameters for the second user; sending the content with the first modification to the first user; and sending the content with the second modification to the second user.

In Example 32, the subject matter of Example 31 optionally includes the content with the first modification is presented to the first user in one of a virtual reality, augmented reality, or mixed reality environment.

In Example 33, the subject matter of Example 32 optionally includes where the operations further comprise updating the user data based upon additional user data received from the first user based upon the content with the first modification being presented to the first user.

In Example 34, the subject matter of any one or more of Examples 31-33 optionally include where the operations further comprise: synchronizing time with the plurality of devices; and relating the received user data with a frame from the content.

In Example 35, the subject matter of any one or more of Examples 31-34 optionally include the user data comprising one of a breathing pattern, heart rate, brainwave pattern, eye dilation, eye movement, geo fence data, ambient lighting data, user motion, facial recognition, facial expression, user agility, hand-eye coordination data, key words, and audio cues.

In Example 36, the subject matter of Example 35 optionally includes where classifying each of the plurality of users comprises operations of determining an emotional state of a user for the content.

In Example 37, the subject matter of any one or more of Examples 35-36 optionally include where classifying each of the plurality of users comprises operations of determining a physical state of a user for the content.

In Example 38, the subject matter of Example 37 optionally includes where identifying personalization parameters comprises operations of determining an amount of user movement suitable for future content.

In Example 39, the subject matter of any one or more of Examples 37-38 optionally include where identifying personalization parameters comprises operations of determining an enjoyment level of the content.

In Example 40, the subject matter of any one or more of Examples 31-39 optionally include where modifying the content with the first modification for the first user comprises operations of determining an insertion location for a content event.

In Example 41, the subject matter of Example 40 optionally includes where the operations further comprise determining an effectiveness of the content event.

In Example 42, the subject matter of Example 41 optionally includes where the operations further comprise determining a second insertion location for the content event based upon the effectiveness of the content event.

In Example 43, the subject matter of any one or more of Examples 31-42 optionally include where the operations further comprise determining a level of motion sickness in the first user based upon the user data, where the first modification is based upon the level of motion sickness.

In Example 44, the subject matter of any one or more of Examples 31-43 optionally include where modifying the content with a first modification comprises operations of determining an angle of head movement based on the content and the aggregated user data, the modification is based upon the angle of head movement.

In Example 45, the subject matter of Example 44 optionally includes where the operations further comprise: determining an error amount from the angle of head movement; creating additional content based upon the error amount; and sending the additional content to the first user.

Example 46 is an apparatus for content branch selection, the apparatus comprising: means for receiving user data from a plurality of users, the user data comprising data from a plurality of devices; means for classifying each of the plurality of users based on the user data; means for identifying personalization parameters for each of the plurality of users; means for determining content to present; means for modifying the content with a first modification for a first user based upon the personalization parameters tier the first user; means for modifying the content with a second, different, modification for a second user based upon the personalization parameters for the second user; means for sending the content with the first modification to the first user; and means for sending the content with the second modification to the second user.

In Example 47, the subject matter of Example 46 optionally includes the content with the first modification is presented to the first user in one of a virtual reality, augmented reality, or mixed reality environment.

In Example 48, the subject matter of Example 47 optionally includes means for updating the user data based upon additional user data received from the first user based upon the content with the first modification being presented to the first user.

In Example 49, the subject matter of any one or more of Examples 46-48 optionally include means for synchronizing time with the plurality of devices; and means for relating the received user data with a frame from the content.

In Example 50, the subject matter of any one or more of Examples 46-49 optionally include the user data comprising one of a breathing pattern, heart rate, brainwave pattern, eye dilation, eye movement, geo fence data, ambient lighting data, user motion, facial recognition, facial expression, user agility, hand-eye coordination data, key words, and audio cues.

In Example 51, the subject matter of Example 50 optionally includes where means for classifying each of the plurality of users comprises means for determining an emotional state of a user for the content.

In Example 52, the subject matter of any one or more of Examples 50-51 optionally include where means for classifying each of the plurality of users comprises means for determining a physical state of a user for the content.

In Example 53, the subject matter of Example 52 optionally includes where means for identifying personalization parameters comprises means for determining an amount of user movement suitable for future content.

In Example 54, the subject matter of any one or more of Examples 52-53 optionally include where means for identifying personalization parameters comprises means for determining an enjoyment level of the content.

In Example 55, the subject matter of any one or more of Examples 46-54 optionally include where means for modifying the content with the first modification for the first user comprises means for determining an insertion location for a content event.

In Example 56, the subject matter of Example 55 optionally includes means for determining an effectiveness of the content event.

In Example 57, the subject matter of Example 56 optionally includes means for determining a second insertion location for the content event based upon the effectiveness of the content event.

In Example 58, the subject matter of any one or more of Examples 46-57 optionally include means for determining a level of motion sickness in the first user based upon the user data, where the first modification is based upon the level of motion sickness.

In Example 59, the subject matter of any one or more of Examples 46-58 optionally include where means for modifying the content with a first modification comprises means for determining an angle of head movement based on the content and the aggregated user data, the modification is based upon the angle of head movement.

In Example 60, the subject matter of Example 59 optionally includes means for determining an error amount from the angle of head movement; means for creating additional content based upon the error amount; and means for sending the additional content to the first user.

Example 61 is at least one machine-readable medium including instructions, which when executed by a machine, cause the machine to perform operations of any of the methods of Examples 16-30.

Example 62 is an apparatus comprising means for performing any of the methods of Examples 16-30.

Example 63 is at least one machine-readable medium including instructions, which when executed by a machine, cause the machine to perform operations of any of the operations of Examples 1-60.

Example 64 is an apparatus comprising means for performing any of the operations of Examples 1-60.

Example 65 is a system to perform the operations of any of the Examples 1-60.

Example 66 is a method to perform the operations of any of Examples 1-60.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for content branch selection, the system comprising:
   processing circuitry to:
   aggregate user data and content data from a plurality of users, the user data and content data provided from a plurality of devices, the user data collected while the content data is displayed by the plurality of devices, and the user data comprising one of: a breathing pattern, heart rate, brainwave pattern, eye dilation, eye movement, geo fence data, ambient lighting data, user motion, facial recognition, facial expression, user agility, hand-eye coordination data, key words, and audio cues;
   classify a physical state with a response classifier for each of the plurality of users based on the user data and the content data, wherein the response classifier is trained using the user data and content data;
   identify personalization parameters for each of the plurality of users;
   identify content to present to the plurality of users, including a first user and a second user; determine, using the response classifier, a first amount of user movement and a first rate of changes of the identified content for the first user based on a physical state of the first user and the identified content;
   modify the identified content with a first modification based on the first amount of user movement and the first rate of changes of the identified content for the first user and personalization parameters for the first user;
   determine, using the response classifier, a second amount of user movement and a second rate of changes of the identified content for the second user based on a physical state of the second user and the identified content;
   modify the identified content with a second, different, modification based on the second amount of user movement and the second rate of changes of the identified content for the second user and personalization parameters for the second user;
   send the identified content with the first modification to the first user; and send the identified content with the second modification to the second user.

2. The system of claim 1, the identified content with the first modification is presented to the first user in in one of a virtual reality, augmented reality, mixed reality environment.

3. The system of claim 2, wherein the processing circuitry is to update the user data based upon additional user data received from the first user based upon the identified content with the first modification being presented to the first user.

4. The system of claim 1, further comprising a trusted execution environment to synchronize time with the plurality of devices, wherein the processing circuitry is to relate the received user data with a frame from the content data.

5. The system of claim 1, where to classify each of the plurality of users the processing circuitry is to determine an emotional state of a user for the content data.

6. The system of claim 1, where to identify personalization parameters the processing circuitry is to determine an enjoyment level of the content data.

7. The system of claim 1, where to modify the identified content with the first modification for the first user the processing circuitry is to determine an insertion location for a content event.

8. The system of claim 7, where the processing circuitry is to determine an effectiveness of the content event.

9. The system of claim 8, where the processing circuitry is to determine a second insertion location for the content event based upon the effectiveness of the content event.

10. The system of claim 1, where the processing circuitry is to determine a level of motion sickness in the first user based upon the user data, where the first modification is based upon the level of motion sickness.

11. The system of claim 1, where to modify the identified content with a first modification the processing circuitry is to determine an angle of head movement based on the identified content and the aggregated user data, the modification is based upon the angle of head movement.

12. The system of claim 11, where the processing circuitry is to:
   determine an error amount from the angle of head movement;
   create additional content based upon the error amount; and
   send the additional content to the first user.

13. A method for content branch selection, the method comprising:
   receiving user data and content data from a plurality of users, the user data and content data provided from a plurality of devices, the user data collected while the content data is displayed by the plurality of devices, and the user data comprising one of: a breathing pattern, heart rate, brainwave pattern, eye dilation, eye movement, geo fence data, ambient lighting data, user motion, facial recognition, facial expression, user agility, hand-eye coordination data, key words, and audio cues;
   classifying a physical state with a response classifier for each of the plurality of users based on the user data and the content data, wherein the response classifier is trained using the user data and content data;
   identifying personalization parameters for each of the plurality of users;
   identifying content to present to the plurality of users, including a first user and a second user; determining, using the response classifier, a first amount of user movement and a first rate of changes of the identified content for the first user based on a physical state of the first user and the identified content;
   modifying the identified content with a first modification based on the first amount of user movement and the first rate of changes of the identified content for the first user and personalization parameters for the first user;
   determining, using the response classifier, a second amount of user movement and a second rate of changes of the identified content for the second user based on a physical state of the second user and the identified content;
   modifying the identified content with a second, different, modification based on the second amount of user movement and the second rate of changes of the identified content for the second user and personalization parameters for the second user;
   sending the identified content with the first modification to the first user; and sending the identified content with the second modification to the second user.

14. The method of claim 13, the identified content with the first modification is presented to the first user in one of a virtual reality, augmented reality, mixed reality environment.

15. The method of claim 14, further comprising updating the user data based upon additional user data received from the first user based upon the identified content with the first modification being presented to the first user.

16. At least one non-transitory computer-readable medium, including instructions, which when executed by a machine, cause the machine to perform operations:
   receiving user data and content data from a plurality of users, the user data and content data provided from a plurality of devices, the user data collected while the content data is displayed by the plurality of devices, and the user data comprising one of: a breathing pattern, heart rate, brainwave pattern, eye dilation, eye movement, geo fence data, ambient lighting data, user motion, facial recognition, facial expression, user agility, hand-eye coordination data, key words, and audio cues;
   classifying a physical state with a response classifier for each of the plurality of users based on the user data and the content data, wherein the response classifier is trained using the user data and content data;
   identifying personalization parameters for each of the plurality of users;
   identifying content to present to the plurality of users, including a first user and a second user; determining, using the response classifier, a first amount of user movement and a first rate of changes of the identified content for the first user based on a physical state of the first user and the identified content;
   modifying the identified content with a first modification based on the first amount of user movement and the first rate of changes of the identified content for the first user and personalization parameters for the first user;
   determining, using the response classifier, a second amount of user movement and a second rate of changes of the identified content for the second user based on a physical state of the second user and the identified content;
   modifying the identified content with a second, different, modification based on the second amount of user movement and the second rate of changes of the identified content for the second user and personalization parameters for the second user;
   sending the identified content with the first modification to the first user; and sending the identified content with the second modification to the second user.

17. The at least one non-transitory computer-readable medium of claim 16, the identified content with the first modification is presented to the first user in one of a virtual reality, augmented reality, mixed reality environment.

18. The at least one non-transitory computer-readable medium of claim 17, where the operations further comprise updating the user data based upon additional user data received from the first user based upon the identified content with the first modification being presented to the first user.

19. The at least one non-transitory computer-readable medium of claim 16, where the operations further comprise:
   synchronizing time with the plurality of devices; and
   relating the received user data with a frame from the content data.

20. An apparatus for content branch selection, the apparatus comprising:
   means for receiving user data and content data from a plurality of users, the user data and content data provided from a plurality of devices, the user data collected while the content data is displayed by the plurality of devices, and the user data comprising one of:

a breathing pattern, heart rate, brainwave pattern, eye dilation, eye movement, geo fence data, ambient lighting data, user motion, facial recognition, facial expression, user agility, hand-eye coordination data, key words, and audio cues;

means for classifying a physical state with a response classifier for each of the plurality of users based on the user data and the content data, wherein the response classifier is trained using the user data and content data;

means for identifying personalization parameters for each of the plurality of users;

means for identifying content to present to the plurality of users, including a first user and a second user;

means for determining, using the response classifier, a first amount of user movement and a first rate of changes of the identified content for the first user based on a physical state of the first user and the identified content;

means for modifying the identified content with a first modification based on the first amount of user movement and the first rate of changes of the identified content for the first user and personalization parameters for the first user;

means for determining, using the response classifier, a second amount of user movement and a second rate of changes of the identified content for the second user based on a physical state of the second user and the identified content;

means for modifying the identified content with a second, different, modification based on the second amount of user movement and the second rate of changes of the identified content for the second user and personalization parameters for the second user;

means for sending the identified content with the first modification to the first user; and means for sending the identified content with the second modification to the second user.

21. The apparatus of claim 20, the identified content with the first modification is presented to the first user in one of a virtual reality, augmented reality, mixed reality environment.

* * * * *

UNITED STATES PATENT AND TRADEMARK OFFICE
CERTIFICATE OF CORRECTION

PATENT NO. : 10,482,566 B2  
APPLICATION NO. : 15/937425  
DATED : November 19, 2019  
INVENTOR(S) : Poornachandran et al.

Page 1 of 1

It is certified that error appears in the above-identified patent and that said Letters Patent is hereby corrected as shown below:

In the Claims

In Column 16, Line 24, in Claim 1, after "user;", insert --¶--

In Column 16, Line 44, in Claim 1, after "and", insert --¶--

In Column 17, Line 42, in Claim 13, after "user;", insert --¶--

In Column 17, Line 62, in Claim 13, after "and", insert --¶--

In Column 18, Line 25, in Claim 16, after "user;", insert --¶--

In Column 18, Line 45, in Claim 16, after "and", insert --¶--

In Column 20, Line 14, in Claim 20, after "and", insert --¶--

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*